3,241,033
MULTIPHASE WAVE GENERATOR UTILIZING BISTABLE CIRCUITS AND LOGIC MEANS

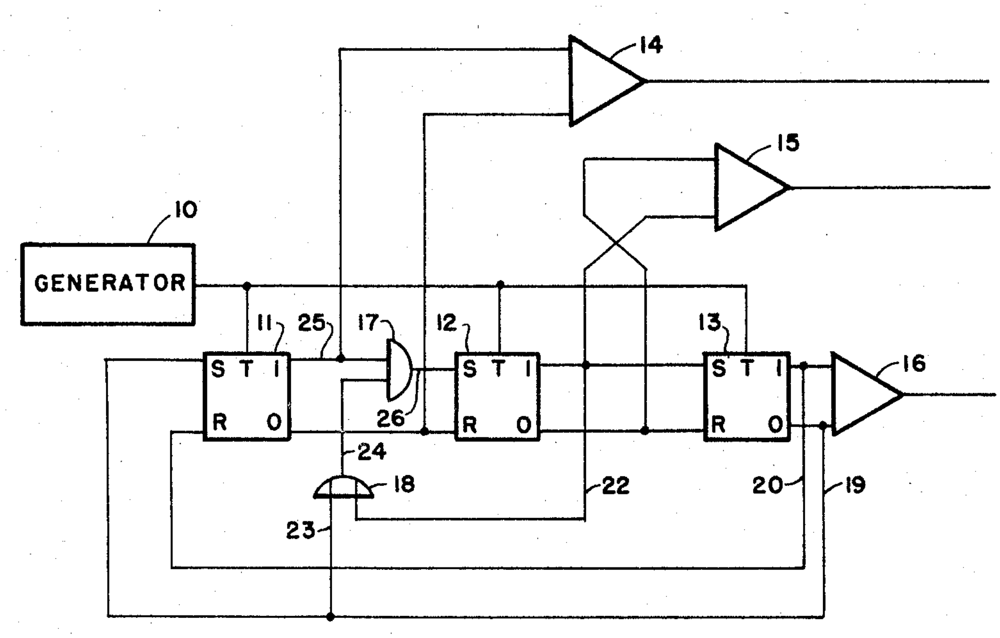
FIG. 1
| | | STAGES | | |
|---|---|---|---|---|
| | | 11 | 12 | 13 |
| TRIGGERING PULSE | 0 | 0 | 0 | 0 |
| | 1 | 1 | 0 | 0 |
| | 2 | 1 | 1 | 0 |
| | 3 | 1 | 1 | 1 |
| | 4 | 0 | 1 | 1 |
| | 5 | 0 | 0 | 1 |
| | 6 | 0 | 0 | 0 |
FIG. 2A
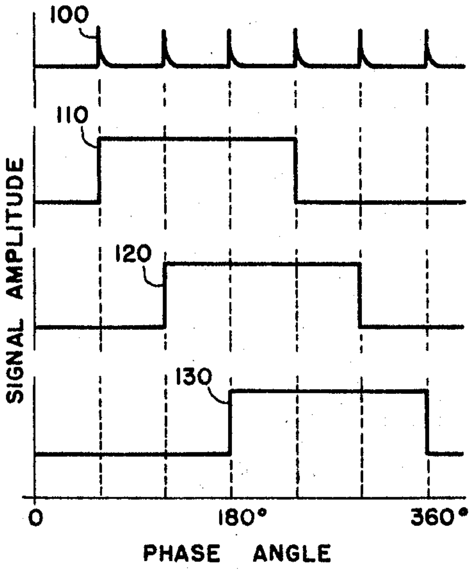
FIG. 2B
INVENTORS
LAWRENCE R. PEASLEE
MURRAY ROSENBLATT
BY Robert R. Strack
ATTORNEY FIG. 3
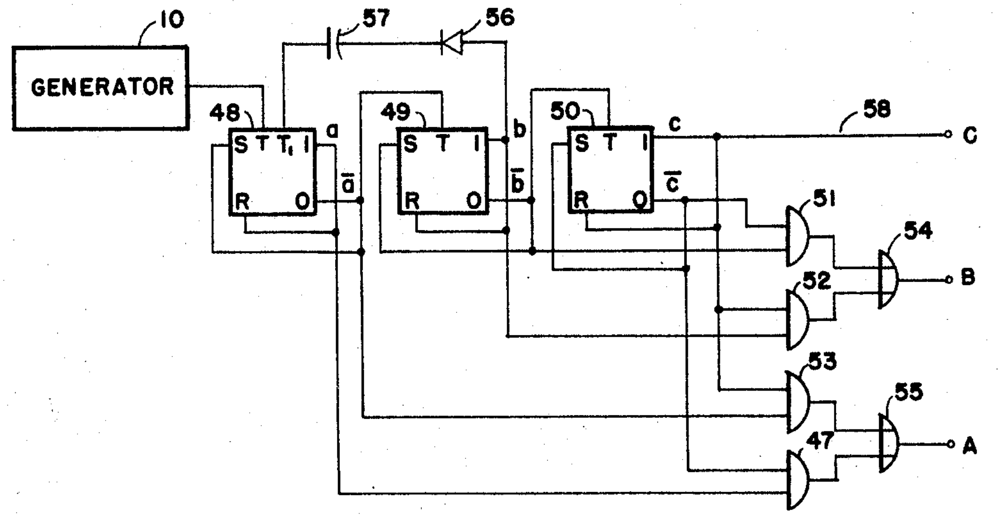
| TRIGGERING PULSE | STAGES 48 | 49 | 50 | OUTPUTS 55 | 54 | 58 |
|---|---|---|---|---|---|---|
| 0 | 0 | 0 | 0 | 0 | 1 | 0 |
| 1 | 1 | 0 | 0 | 1 | 1 | 0 |
| 2 | 0 | 1 | 0 | | | |
| | 1 | 1 | 0 | 1 | 0 | 0 |
| 3 | 0 | 0 | 1 | 1 | 0 | 1 |
| 4 | 1 | 0 | 1 | 0 | 0 | 1 |
| 5 | 0 | 1 | 1 | | | |
| | 1 | 1 | 1 | 0 | 1 | 1 |
| 6 | 0 | 0 | 0 | 0 | 1 | 0 |
FIG. 4A
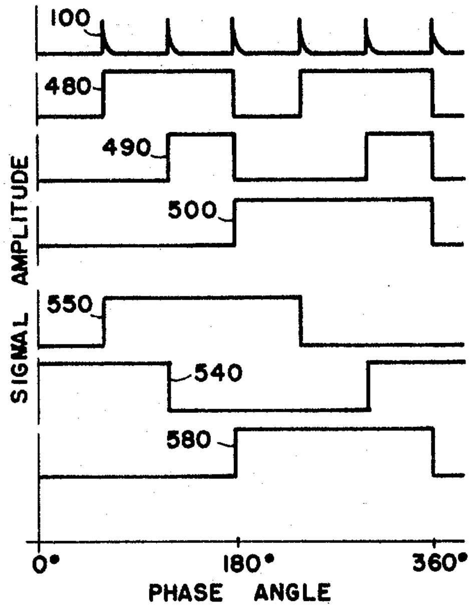
FIG. 4B
INVENTORS
LAWRENCE R. PEASLEE
MURRAY ROSENBLATT
BY
Robert R. Strack
ATTORNEY INVENTORS
LAWRENCE R. PEASLEE
MURRAY ROSENBLATT
BY
Robert R. Strack
ATTORNEY United States Patent Office 3,241,033
Patented Mar. 15, 1966

Lawrence R. Peaslee, Waynesboro, Va., and Murray Rosenblatt, Haddonfield, N.J., assignors to General Electric Company, a corporation of New York Filed July 28, 1961, Ser. No. 127,677
11 Claims. (Cl. 321—5)

This invention relates to the conversion of direct current power to multiphase power and particularly, to the development of multiphase rectangular waveform outputs in response to a single phase input.

In the past, multiphase outputs have generally been developed from single phase sinusoidal inputs. Difficulties arising in this conversion process included: the requirement of special input signals, the difficulty of maintaining accurate phase displacement in the output, and the development of desired waveforms in the output. For example, to produce outputs of acceptable form, it was often necessary to utilize expensive and cumbersome filtering means.

Present techniques of frequency conversion and multiple phase generation include circuits wherein well defined multiphase outputs are synthesized from a plurality of rectangular waves accurately displaced from one another by a fixed phase angle. Utilization of these techniques permits the use of relatively simple and convenient filtering means to furnish a desired output. Furthermore, numerous applications now exist for the direct utilization of rectangular wave signals accurately displaced in phase from one another by particular amounts.

An object of the present invention is to provide a multiphase wave generator utilizing a minimum of inexpensive circuit elements and yielding reliable, well-balanced, and well-defined wave shapes at the output.

Another object of the invention is to provide a multiphase wave generator responsive to periodic signals to provide a plurality of rectangular wave outputs having a fixed displacement from one another.

Still another object of the invention is to provide a multiphase generator wherein accurate phase angle displacement between each output signal is in no way dependent upon the waveform of the input signal.

By employing bistable devices as output stages of a multiphase generator it is possible to obtain fundamentally rectangular waveforms with a minimum of additional circuitry. Such devices may be either driven by an external high precision oscillating source or may be self-oscillating. Connection of the bistable devices in combinations wherein a discrete number of permutations and combinations of states may be imposed, establishes a fundamental circuit from which desired phase outputs may be extracted as outputs.

Another object of the invention is to provide means for utilizing bistable stages to generate multiphase outputs of rectangular waveform.

In accordance with the embodiments described hereinafter, the invention is directed toward a digital phase converter employing a plurality of bistable stages connected in cascade, the outputs of which are used either directly or in combination to provide rectangular outputs separated in phase by a selected amount. The state of each bistable stage used herein is employed as a voltage level and the stages are interconnected as shift registers, counters, or a combination of counters and shift registers to yield N permutations of states. The output of each stage is then used either directly or via logic circuitry to yield rectangular wave outputs having $N/2$ phases accurately displaced from one another by $720/N$ degrees. Logic circuitry is employed in accordance with logic equations to develop the specific combinations of outputs from each stage required to yield a desired signal.

Modifications of the illustrative embodiments, to be mentioned hereinafter, make possible the generation of multiphase signals of from two to N phases having a variety of phase displacements.

The novel features of the invention are set forth with particularity in the appended claims. The invention itself, however, both as to its organization and method of operation, together with further objects and features thereof, may best be understood by reference to the following description taken in conjunction with the accompanying drawings wherein:

FIG. 1 is a block diagram schematic showing circuit elements and logic for a digital phase converter employing a plurality of shift register stages in accordance with the invention;

FIG. 2A is a truth table illustrating the states assumed by each stage in the shift register of FIG. 1 during a cycle of operation;

FIG. 2B illustrates the voltage waveforms appearing at the output of the stages shown in FIG. 1 during a cycle of operation;

FIG. 3 is a block diagram schematic showing circuit elements and logic for a digital phase converter employing a plurality of counter stages in accordance with the invention;

FIG. 4A is a truth table illustrating the states assumed by each stage of the counter in FIG. 3 during a cycle of operation and also illustrating a desired three-phase output for each interval in a cycle;

FIG. 4B illustrates the voltage waveforms appearing at the output of the stages of the counter in FIG. 3 and at the output of the phase converter during a cycle of operation;

FIG. 1 illustrates a shift register arrangement for developing a three-phase rectangular voltage from a single phase source. In this embodiment, the single phase source comprises a generator 10 which provides square waves or pulses at a repetition rate six times the desired output frequency. As described later, the particular signals supplied by generator 10 may assume a variety of forms. A shift register consisting of bistable stages 11, 12, and 13 is triggered by the pulses from generator 10 and the output from each stage of the shift register is amplified by push-pull amplifiers 14, 15, and 16 for application to succeeding stages in, for example, an inverter circuit (which is not shown).

Figure 6:
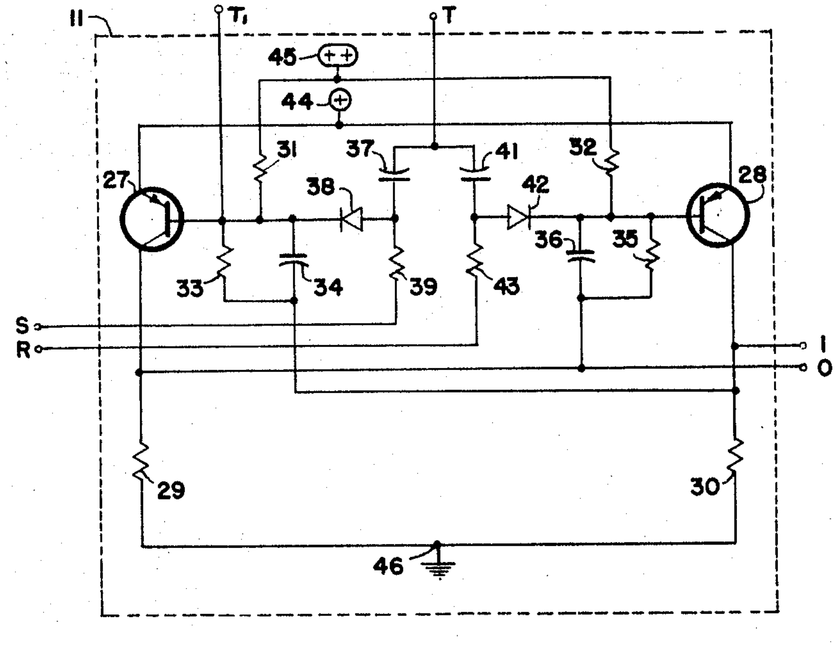
FIG. 6 is a circuit schematic of a typical flip flop for use as a stage in either the counter or shift register units.

Each bistable stage 11, 12, or 13 is represented as a box having input terminals "S" and "R," output terminals "1" and "0", and a triggering terminal "T." As well known in the art, each of these bistable stages may consist of a bistable multivibrator or "flip flop" circuit. A typical flip flop circuit, utilizing transistors, is illustrated in FIG. 6 and will be described in detail hereinafter. However, it should be understood that any suitable bistable device may be incorporated into the invention.

For purposes of description, it is convenient to regard the bistable stages as residing in the state represented by the output terminal having a positive voltage with respect to the other output terminal. For example, stage 11 is considered as residing in the "1" state when the voltage appearing on output terminal 1 is greater than the voltage appearing on output terminal 0. The state of a stage is changed by applying a pulse to the triggering terminal T when the input terminals S or R are "enabled"; enablement merely indicating that a voltage of preselected magnitude is present on one of the terminals. When the set terminal S is enabled during application of a triggering pulse, the stage switches to a "1" state. When the reset terminal R is enabled during application of a triggering pulse, the stage switches to a "0" state. If the enabled input terminal and the existing state of the stage coincide, the application of a triggering pulse has no effect.

An understanding of the phase converter in FIG. 1 may be obtained by first considering operation without regard to the logic circuits 17 and 18 shown therein. Under this assumption, the 1 and 0 outputs of stages 11 and 12 are directly connected to the S and R inputs respectively of stages 12 and 13. The outputs of stage 13 are re-entrantly coupled to the input of stage 11 via conductors 19 and 20. This connection is inverted in comparison with the previously described connections and the 1 and 0 outputs of stage 13 are connected to the R and S inputs respectively of stage 11. Generally, this interconnection of stages provides for transfer of state from stage to stage as triggering pulses are applied, because the output of each preceding stage enables the corresponding input of each succeeding stage. The inverted re-entrant connection from stage 13 to stage 11, of course, results in transfer of the opposite state.

The truth table in FIG. 2A shows the states of each shift register stage following the application of a switching pulse to the triggering terminal thereof. As shown, successive lines on the table represent the application of successive triggering pulses and each column on the table represents the state of a particular stage. Thus, the various states stage 11 in FIG. 1 assumes during a cycle of operation are shown in the first column.

Initially, it is assumed that all stages reside in the 0 state. This is indicated in line 0. Simultaneous application of a triggering pulse from generator 10 to each stage results in a transfer of the states of stages 11 and 12 to stages 12 and 13 respectively and due to the inversion between stages 13 and 11, the state of stage 13 is reversed and assumed by stage 11. Thus, in line 2 it will be seen that following application of the first triggering pulse the stages have assumed the states 1–0–0 reading from left to right. Successive applications of triggering pulses result in the successive permutations of states shown in the table and following application of the sixth pulse the initial condition of 0–0–0 is again assumed. The application of six input pulses results in a complete cycle of operation of the shift register and this cycle will continue indefinitely.

The waveforms 110, 120, and 130, illustrated in FIG. 2B, represent the voltages appearing at the 1 outputs of stages 11, 12, and 13 respectively. As shown in FIG. 2B, a "1" state is represented by a positive voltage and a "0" state is represented by a zero voltage. The output of generator 10 is represented by the triggering pulses in waveform 100. It is apparent from FIG. 2B that if a complete cycle occurs upon application of six pulses, the variation between the "1" output of each stage represents a displacement of 60°. The "0" outputs of stages 11, 12, and 13 are similar to waveforms 110, 120, and 130 respectively except that they are each 180° displaced. By selecting the "1" outputs of stages 11 and 13 and the "0" output of stage 12, a three phase square wave output is obtained and the three outputs mutually have 120° phase displacement between them. This is obviously a three-phase rectangular wave output having a frequency equal to one-sixth that of the repetition rate of the triggering pulses from generator 10. The remaining three outputs from stages 11, 12, and 13 are also 120° displaced from each other and also comprise a three phase system. This second three phase system is 180° displaced from the first three phase system. Thus, if all six outputs are used, a three phase full wave system is had.

The foregoing discussion has described the phase converter in FIG. 1 assuming the absence of logic gates 17 and 18. In actual operation, these gates are essential because with a group of three bistable stages, eight permutations of states are possible. The truth table in FIG. 2A illustrates a complete cycle of operation in which only six of the possibilities occur; however, upon initial start-up of the system, one of the undesirable permutations of states may exist and the desired phase displacement at the output of each stage will not be attainable. The unwanted permutations are 0–1–0 and 1–0–1.

To insure that the system never gets into a mode of operation including these permutations, AND gate 17 and OR gate 18 are included. The operation and fabrication of these logic elements is well known. In accordance with conventional operation: AND gate 17 furnishes an output voltage on output conductor 26 when both inputs, 25 and 24, are energized; OR gate 18 furnishes an output voltage on conductor 24 when either input 23 or input 22 is energized.

The OR-AND gate combination is connected in the shift register circuit so that whenever the permuation of states is 1–0–1 the "1" in stage 11 will be blocked from passing on to stage 12 and consequently, the next state will be 0–0–0 which is one of the permutations in a correct cycle. Since the remaining incorrect permutation 0–1–0 automatically becomes 1–0–1 under normal operation, after two triggering pulses this initially incorrect permutation of states will also be reduced to 0–0–0. The desired elimination of unwanted permutations is thus simply achieved.

Following the sequence of events responsive to a triggering pulse when the initial combination of states is 1–0–1 will illustrate the functioning of AND gate 17 and OR gate 18. Under the assumed condition, neither input to OR gate 18 is energized because stage 12 is in a "0" state and stage 13 is in a "1" state. Since neither input of gate 18 is energized there is no output voltage on lead 24 and consequently, it is impossible to transmit a pulse through AND gate 17. Simultaneous application of triggering pulses to each of the stages therefore permits shifting of the "0" in stage 12 to stage 13, and the inverted shifting of the "1" in stage 13 to stage 11, making it assume a "0" state. Stage 12, under these conditions, remains in a "0" state and consequently, the acceptable permutation 0–0–0 is attained.

Before proceeding with a description of other illustrative embodiments of the invention, the typical flip flop circuit shown in schematic form in FIG. 6 will be described. The flip flop, as illustrated by the dotted box designated 11, may be considered as showing the details of each individual stage in the shift register of FIG. 1.

The illustrated circuit comprises PNP transistors 27 and 28 symmetrically energized by direct voltage sources 44 and 45. It will be noted that source 45 is designated "++" whereas source 44 is designated "+." This designation indicates that the magnitude of source 45 exceeds that of source 44; no order of magnitude is implied. Of course, energizing voltages and types of transistors are all optional and should be selected in accordance with principles of good design. The collectors of transistors 27 and 28 are connected to ground by load resistors 29 and 30 respectively, and the emitters thereof are supplied by connection to voltage source 44. A normally reversing bias is applied to each transistor 27 and 28 by resistors 31 and 32 connected between voltage source 45 and the respective bases of their transistors.

The base of transistor 27 is cross-coupled to the collector of transistor 28 by the parallel combination of resistor 33 and capacitor 34. A similar combination, resistor 35 and capacitor 36, interconnects the base of transistor 28 and the collector of transistor 27.

Control over the state in which the circuit resides is maintained by supplying voltage to set terminal S or reset terminal R, on the left of FIG. 6. Set terminal S is connected by a resistor 39 and suitably oriented rectifier 38 to apply positive voltages to the base of transistor 27 with respect to its emitter and reset terminal R is connected by a resistor 43 and suitably oriented rectifier 42 to apply positive voltages to the base of transistor 28 with respect to its emitter. Triggering terminal T is connected via capacitors 37 and 41 to the anodes of rectifiers 38 and 42 respectively and is thus effective to selectively deliver positive cut-off voltages to the transistor bases in accordance with the presence of enabling voltages on terminals S or R. Output terminals 1 and 0 are connected to the collectors of transistors 28 and 27 respectively.

To understand the "flip flop" action of the circuit in FIG. 6, assume that transistor 27 is initially conducting and transistor 28 is initially nonconducting. Under these conditions the collector of transistor 27 is essentially at a voltage of +, which is transmitted to output terminal 0, and the collector of transistor 28 is near ground potential, which is transmitted to output terminal 1. Thus, the state of the flip flop is "0." It is also assumed that the input terminal S is enabled by + volts and that the input terminal R is at ground potential.

Under the described conditions, the base of transistor 27 is at approximately zero volts with respect to its emitter which is at + volts, and the anode of diode 38 is at + volts. Thus, a positive triggering pulse appearing on terminal T is transmitted through capacitor 37 and diode 38 to the base of transistor 27 rendering it nonconductive. On the other hand, diode 42 is reverse-biased at this time with + volts on the cathode and approximately zero volts on the anode, and the positive triggering pulse does not appear at the base of transistor 28. Due to the cross-coupling of resistor 35 and capacitor 36 between the collector of tranistor 27 and the base of transistor 28, when transistor 27 is cut off the attendant drop in collector potential of transistor 27 turns transistor 28 on. The voltages on output leads 0 and 1 are now reversed and consequently, reflect the new state, "1" of the flip-flop circuit.

Application of a triggering pulse to terminal T when the stage is in a "1" state and input terminal S is enabled does not modify the state because transistor 27 is already nonconducting. This follows expected operation because the instant flip flop circuit must always reflect the state of the preceding flip flop circuit.

It should be noted that the triggering pulses are always applied through capacitors 37 and 41 in the trigger input. These capacitors provide differentiation so that even square wave trigger signals may be employed to trigger the flip flop. The enabling inputs S and R are injected via resistors 39 and 43 respectively. The capacitors 37 and 41 respectively integrate these inputs giving them a delay. This assures that the enabling signals will remain present until the flip flop has comepletely changed state but will be gone before the next triggering pulse appears.

Before proceeding with a description of other phase converter arrangements, one additional element in the flip flop circuit of FIG. 6 should be noted. This relates to terminal $T_1$ which is connected directly to the base of transistor 27. The application of a positive pulse to terminal $T_1$ is effective at any time to back-bias transistor 27 and consequently, render it nonconducting. This terminal is employed in the illustrative embodiment shown in FIG. 3.

Numerous arrangement may be devised for utilizing bistable devices as counters for developing a phase converter. In FIG. 3 a technique is illustrated that use three flip flops 48, 49, and 50. A truth table and waveforms indicating the various outputs from the circuit of FIG. 3 are illustrated in FIGS. 4A and 4B respectively.

A three stage counter utilizing bistable stages is conventionally used to count up to eight. In the counter of FIG. 3, means are provided comprising diode 56 and capacitor 57 for making the first two stages 48 and 49 count up to three only, and thereupon switch stage 50. The effect of this connection is to render the counter applicable only for a count of six. The effect of this arrangement is reflected in the truth tables in FIG. 4A.

Stages 48, 49, and 50 are interconnected as a conventional counter with the 0 output of each stage connected to the triggering input T of its successor and with the initiating pulse generator 10 connected to the triggering input T of the first stage 48. Within each stage, the 0 output terminal is coupled to the S input terminal and the 1 output terminal is connected to the R input terminal. This causes the stage to switch every time a positive signal appears on trigger terminal T. As mentioned, the basic circuit configuration would provide a complete cycle of operation for each eight input pulses applied from pulse generator 10. By interconnecting the 1 output of stage 49 to secondary trigger terminal $T_1$ of stage 48; however, a cycle is completed in response to only six pulses from pulse generator 10. Logic gates 47, 51, 52, 53, 54, and 55 are employed to convert the output from each stage throughout the course of a complete cycle into a form which permits direct utilization in three phases.

Initially, assume that all stages reside in a "0" state. This is reflected in the 0 line of the left truth table in FIG. 4A by the permutation 0–0–0. Upon application of the first pulse from generator 10, stage 48 is switched to a "1" state. The other stages remain at "0," because only the 0 terminals are interconnected to trigger succeeding stages. Consequently, upon termination of the first triggering pulse, the permutation present is 1–0–0.

Upon application of a second triggering pulse to the T terminal of stage 48, the stage is again switched and this time presents a voltage at its 0 output. This voltage is applied to terminal T of stage 49 and switches it to a "1" state. Stage 50 is still unaffected. When stage 49 switches to a "1" state, a voltage is applied via diode 56 and capacitor 57 to terminal $T_1$ of the initial stage 48. Referring to FIG. 6, this voltage experiences a brief time delay, due to the presence of capacitor 57, after which it is effective to turn off conducting transistor 27. In other words, the first stage is again switched and consequently, now resides in a "1" state. The second switching of stage 48 via the secondary trigger is without effect upon succeeding stages and consequently, a stable permutation of 1–1–0 is achieved. This is illustrated immediately below line 2 of the left truth table in FIG. 4A.

The third triggering pulse results in switching the counter output to 0–0–1 as illustrated in line 3 of the truth table.

The fourth pulse delivered from generator 10 leaves the stages in the states 1–0–1.

The fifth pulse switches the state of stage 48 to "0," and the state of stage 49 to "1." This is also a temporary condition because after a short delay, diode 56 and capacitor 57 again apply a voltage to switch stage 48 from "0" to "1" and thereby yield the stable permutation 1–1–1.

Application of a sixth pulse returns the entire counter to 0–0–0.

Waveforms 480, 490, and 500 in FIG. 4B represent the voltage outputs at the "1" terminals of stages 48, 49, and 50 respectively throughout an entire cycle of operation. It will be seen that the duration of positive voltage from each stage differs. From the previous embodiment it is clear that equivalence of on and off time is necessary in order to develop the desired output. Only waveform 500, representing the output of the final stage 50, is of this form. In order to correctly develop the outputs for the remaining desired phases, AND gates 47, 51, 52, and 53 and OR gates 54 and 55 are employed.

AND gate 51 is connected to provide an output when the 0 output of stage 49 and the 0 output of stage 50 occur simultaneously; AND gate 52 is connected to provide an output when the 1 output of stage 49 and the 1 output of stage 50 appear simultaneously; AND gate 53 is connected to provide an output when the 0 output of stage 48 and the 1 output of stage 50 occur simultaneously; and AND gate 47 is connected to provide an output when the 1 output of stage 48 and the 0 output of stage 50 occur simultaneously. OR gates 54 and 55 are connected selectively to the outputs of the AND gates in order to yield the waveforms illustrated in FIG. 4B as 540 and 550 respectively. OR gate 54 is connected to provide an output when either AND gate 51 or 52 provides an output and OR gate 55 is connected to provide an output when either AND gate 47 or 53 provides an output.

For clarity of explanation of the logic configuration in FIG. 3, the outputs of the successive stages of the modified counter have been labeled $a$–$\bar{a}$, $b$–$\bar{b}$, and $c$–$\bar{c}$, where $\bar{a}$, $\bar{b}$, and $\bar{c}$ represent 0 outputs of stages 48, 49, and 50 respectively and $a$, $b$, and $c$ represent the 1 outputs of stages 48, 49, and 50 respectively. In accordance with conventional notation, it will be recognized that $\bar{a}$ means "not $a$" or the inverse of $a$, and that similar meaning is ascribed to $\bar{b}$ and $\bar{c}$.

The desired output for a three-phase supply has been shown in the right portion of FIG. 4A. The object of the logic circuitry in FIG. 3 is to convert the outputs of the counter shown in the left portion of FIG. 4A to that shown in the right portion. In another form, the objective of the logic circuitry is to convert the waveforms 480, 490, and 500 shown in the upper portion of FIG. 4B to the waveforms 550, 540, and 580 shown in the lower portion of FIG. 4B.

Logic equations to achieve the desired conversion take the form:

$$A=a\bar{c}+\bar{a}c$$
$$B=\bar{b}\bar{c}+bc$$
$$C=c$$

Where A is represented by waveform 550 and is shown in the right truth table as the first column, B is represented by waveform 540 and is shown in the second column of the right truth table, and C is represented by waveform 580 and is shown in the third column of the right truth table.

It will be recognized immediately that $\bar{b}\bar{c}$ represents the output of AND gate 51 and $bc$ represents the output of AND gate 52. It is further apparent that OR gate 54 provides an output equivalent to $\bar{b}\bar{c}+bc$. Consequently, the combination of AND gates 51 and 52 and OR gate 54 perform the function required to develop waveform 540 which is an integral part of the three-phase output desired. It will be similarly understood that AND gates 47 and 53 in combination with OR gate 55 develop waveform 550. Waveform 580 is identical to the 1 output of stage 50 and consequently, no further operations need be performed thereon.

Figure 5:
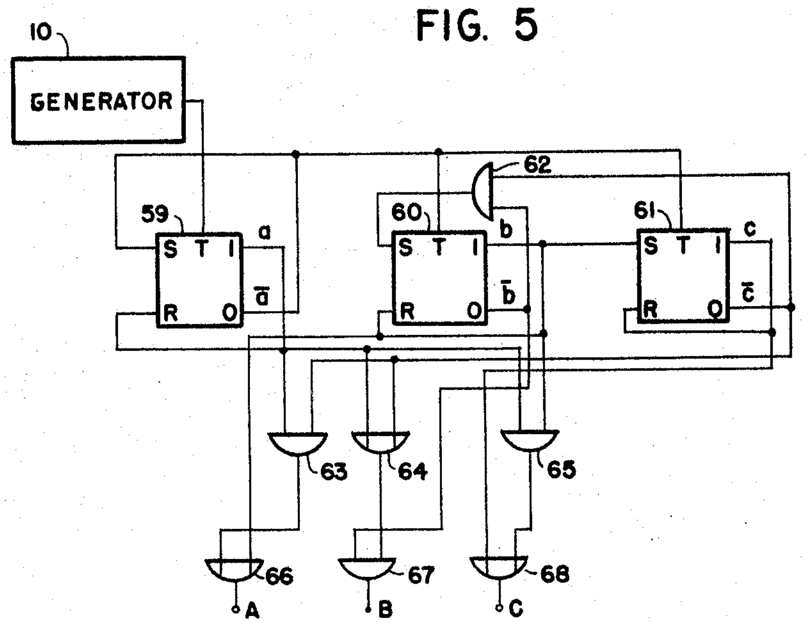
FIG. 5 is a block diagram schematic showing the circuit elements and logic for a digital phase converter employing a hybrid counter.

FIG. 5 illustrates still another counter arrangement for developing a three-phase output from a single phase input. As shown therein, three bistable stages 59, 60, and 61 are interconnected with one another and a plurality of logic gates to yield a counter which re-cycles every six pulses and produces a plurality of square waves at the output of OR gates 66 and 68 and AND gate 67 which are 120° displaced from one another.

In FIG. 5 the first bistable stage 59 is connected as a binary counter to supply a single output pulse at the 0 output for every two input pulses on terminal T. The second and third bistable stages, 60 and 61, are connected as a shift register, receiving input pulses on trigger terminal T simultaneously from the 0 output of stage 59. Stage 60 and stage 61 are connected to count to three; consequently, one output appears on the 0 output of stage 61 for every three pulses received from pulse generator 10. A complete cycle of possible permutations of states occurs in response to every six input pulses.

AND gate 62 has inputs connected to the 0 outputs of stages 60 and 61 and an output connected to the set input S of stage 60. When stages 60 and 61 both reside in the 0 state a voltage is thus applied to the input S of stage 60 insuring that the subsequent application of a triggering pulse to the terminal T thereof will switch it to a "1". This interconnection with logic AND gate 62 renders stages 60 and 61 capable of completely re-cycling every three trigger pulses.

In order to utilize the outputs of the counter in FIG. 5 to develop a three-phase rectangular wave signal, the following logic equations are appropriate. Once again it will be noted that the outputs of each counter have been designated $a$–$\bar{a}$, $b$–$\bar{b}$, and $c$–$\bar{c}$.

$$A=b+a\bar{c}$$
$$B=\bar{b}(a+\bar{c})$$
$$C=c+ab$$

The logic gates 63 through 68 are connected to perform the indicated functions. For example, output A appears at the output of OR gate 66. Checking the circuitry, it will be seen that the output is derived by inserting the 1 output ($a$) of stage 59 and the 0 output ($\bar{c}$) of stage 61 into AND gate 63 and combining the output ($a\bar{c}$) of AND gate 63 with the 1 ouput ($\bar{b}$) of stage 60 in OR gate 66. The other circuit connections have been made in accordance with the above equations.

Three specific utilizations of bistable stages in conjunction with logic circuitry to develop multiphase outputs have been shown: a first, employing a shift register; a second, employing a counter; and a third, employing a combination counter and shift register. In each of these utilizations, a single phase input in the form of either pulses or square waves was converted to a three-phase rectangular outputs. Multiphase outputs of any desired phase displacement may be developed in accordance with the teachings of this invention and there is no limitation upon the specific number of phases generated. Furthermore, as previously mentioned, the particular type of counter or shift register employed is not germane to the invention.

In addition to the above, while there have been shown particular embodiments of this invention it will, of course, be understood that it is not wished to be limited thereto since modifications may be made both in the circuit arrangements and in the instrumentalities employed and it is contemplated in the appended claims to cover any such modifications as fall within the true spirit and scope of the invention.

What is claimed as new and desired to be secured by Letters Patent of the United States is:

1. In a multiphase wave generator, a plurality of bistable devices all directly coupled in tandem with the exception of one to periodically produce N stable permutations of states, including those permutations wherein each device exhibits the same state, said states being discretely identified by voltage levels, means connected to each of said devices and responsive to the voltage levels thereof to provide N individual outputs separated in phase by 360/N degrees, and means selectively connected to said N individual outputs to develop a multiphase signal having N/2 phases separated by a multiple of 360/N degrees.

2. In a multiphase wave generator, a source of periodic signals, a plurality of bistable stages supplied by said signals and all directly coupled in tandem with the exception of one to produce N stable permutations of states in response to successive applications of said signals, said permutations including those wherein each device exhibits the same state, means connected to each of said bistable stages yielding N individual voltage signals responsive to the states of said stages, said voltage signals being displaced in phase from one another by 360/N degrees, and means selectively connected to said N individual outputs to develop a multiphase signal having N/2 phases separated by a multiple of 360/N degrees.

3. A multiphase wave generator as defined in claim 2 wherein said plurality of bistable stages is interconnected as a shift register including logic means interposed between selected stages for inhibiting the transfer of states therebetween when preselected permutations of states occur.

4. A multiphase wave generator as defined in claim 3 wherein said shift register is re-entrantly connected and wherein the connection from one of said bistable devices to its successor is reversed to cause a reversal of the state transferred.

5. A multiphase wave generator as defined in claim 2 wherein said plurality of bistable stages comprises a binary counter driving a shift register, said shift register including means for limiting the permutations of stable states of all said stages to N.

6. In a multiphase wave generator, a source of periodic signals, a plurality of bistable stages responsive to said periodic signals and directly coupled to form a reentrant shift register with the re-entrant path being reversed to cause the receiving stage to assume the state different from the transmitting stage, the state of each stage being manifested as one of two possible voltage levels, inhibiting means interposed between selected ones of said bistable stages and operative when a particular permutation of states exists to prevent shifting between said selected bistable stages, thereby limiting the total of possible permutations to a predetermined number, and means for combining the outputs of said bistable stages to yield a multiphase signal wherein each phase is equally displaced from both the preceding and the succeeding phase.

7. In a multiphase wave generator, a source of periodic signals, a plurality of bistable stages interconnected as a counter operative to count said periodic signals, each of said bistable stages producing a discrete voltage level for each state thereof, means connected with said counter to limit the maximum permutations of states of all stages taken cumulatively to a number equal to twice the number of desired phases, and logic gating means selectively connected to the outputs of each of said bistable stages to provide a multiphase signal wherein each phase is equally displaced from both the preceding and the succeeding phase.

8. In a multiphase wave generator, a source of periodic signals, three bistable devices yielding dual outputs $a$, $\bar{a}$, $b$, $\bar{b}$, and $c$, $\bar{c}$ wherein $a$, $b$, $c$ represent a first state of each of said devices respectively and $\bar{a}$, $\bar{b}$, $\bar{c}$ represent the second state of said devices respectively, means interconnecting said bistable devices and said source of periodic signals to yield six stable permutations of states, and logic means selectively connected to the outputs of said bistable devices to yield a first, second, and third signal displaced from one another by 120°.

9. A multiphase wave generator as defined in claim 8 wherein said logic means are connected to the outputs of said bistable devices to yield first, second, and third signals in accordance with the equations:

$$\text{First signal}=a\bar{c}+\bar{a}c$$
$$\text{Second signal}=\bar{b}\bar{c}+bc$$
$$\text{Third signal}=c$$

10. A multiphase wave generator as defined in claim 8 wherein said logic means are connected to the outputs of said bistable devices to yield first, second, and third signals in accordance with the equations:

$$\text{First signal}=b+a\bar{c}$$
$$\text{Second signal}=\bar{b}(a+\bar{c})$$
$$\text{Third signal}=c+ab$$

11. A multiphase wave generator as defined in claim 2 wherein said plurality of bistable stages are interconnected in a counting chain, said generator including means responsive to said periodic signals and to the output of a selected one of said bistable stages to increase the count of said counting chain by one digit following a particular number of said periodic signals, said particular number being determined by which one of the said bistable stages is the selected one.

References Cited by the Examiner

UNITED STATES PATENTS

| | | | |
|---|---|---|---|
| 2,899,572 | 8/1959 | Skelton et al. | 307—88.5 |
| 2,988,654 | 6/1961 | Katzenstein | 307—88.5 |
| 3,040,198 | 6/1962 | Maley | 307—88.5 |
| 3,052,833 | 9/1962 | Coolidge et al. | 321—45 |

OTHER REFERENCES

"Ultra-Low-Frequency, Three-Phase Oscillator," by G. Smiley, published in Proceedings of the IRE of April 1954, pp. 677–680.

LLOYD McCOLLUM, *Primary Examiner.*